US009520066B2

(12) United States Patent
Spinelli et al.

(10) Patent No.: US 9,520,066 B2
(45) Date of Patent: Dec. 13, 2016

(54) DETERMINING LANDING SITES FOR AIRCRAFT

(75) Inventors: Charles B. Spinelli, Bainbridge Island, WA (US); Bradley William Offer, Burien, WA (US); Alan Eugene Bruce, Kent, WA (US); Robert Lusardi, Salem, OR (US); Steven Furman Cuspard, Renton, WA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 12/764,797

(22) Filed: Apr. 21, 2010

(65) Prior Publication Data

US 2011/0264312 A1 Oct. 27, 2011

(51) Int. Cl.

| | |
|---|---|
| ***G05D 1/00*** | (2006.01) |
| ***G08G 5/00*** | (2006.01) |
| *G08G 5/02* | (2006.01) |

(52) U.S. Cl.

CPC .......... *G08G 5/0056* (2013.01); *G08G 5/0021* (2013.01); *G08G 5/0039* (2013.01); *G08G 5/02* (2013.01)

(58) Field of Classification Search

CPC .. G08G 5/0021; G08G 5/0039; G08G 5/0056; G08G 5/02

USPC ............. 701/3–4, 7, 16, 400, 408–412, 415; 340/945–951; 244/75.1, 76 R, 175, 177, 186

See application file for complete search history.

(56) References Cited

U.S. PATENT DOCUMENTS

| | | | |
|---|---|---|---|
| 4,086,632 A | 4/1978 | Lions | |
| 4,368,517 A | 1/1983 | Lovering | |
| 5,057,835 A * | 10/1991 | Factor et al. | 340/995.27 |
| 5,398,186 A * | 3/1995 | Nakhla | 701/16 |
| 5,820,080 A * | 10/1998 | Eschenbach | 244/183 |
| 5,842,142 A * | 11/1998 | Murray et al. | 701/16 |
| 6,405,107 B1 * | 6/2002 | Derman | 701/3 |

(Continued)

FOREIGN PATENT DOCUMENTS

| | | |
|---|---|---|
| EP | 1482277 | 12/2004 |
| EP | 1796060 A1 | 6/2007 |

(Continued)

OTHER PUBLICATIONS

International Search Report dated Nov. 21, 2011 in PCT Application No. PCT/US2011/028795.

(Continued)

*Primary Examiner* — John Q Nguyen
*Assistant Examiner* — Anshul Sood
(74) *Attorney, Agent, or Firm* — Baldauff IP, LLC; Michael J. Baldauff, Jr.

(57) ABSTRACT

A routing tool is disclosed. The routing tool is configured to determine a landing site for an aircraft by receiving flight data. The routing tool identifies at least one landing site proximate to a flight path and generates a spanning tree between the landing site and the flight path. According to some embodiments, the landing sites are determined in real-time during flight. Additionally, the landing sites may be determined at the aircraft or at a remote system or device in communication with the aircraft. In some embodiments, the routing tool generates one or more spanning trees before flight. The spanning trees may be based upon a flight plan, and may be stored in a data storage device. Methods and computer readable media are also disclosed.

19 Claims, 12 Drawing Sheets

(56) References Cited

U.S. PATENT DOCUMENTS

| | | | | |
|---|---|---|---|---|
| 6,469,654 | B1 * | 10/2002 | Winner et al. | 342/33 |
| 6,519,527 | B2 * | 2/2003 | Shinagawa | 701/411 |
| 6,643,580 | B1 | 11/2003 | Naimer et al. | |
| 6,804,585 | B2 * | 10/2004 | Humbard et al. | 701/3 |
| 6,871,124 | B1 * | 3/2005 | McElreath | 701/16 |
| 6,963,291 | B2 | 11/2005 | Holforty et al. | |
| 7,689,328 | B2 * | 3/2010 | Spinelli | 701/7 |
| 7,724,240 | B2 * | 5/2010 | Gyde et al. | 345/168 |
| 8,285,427 | B2 * | 10/2012 | Rogers et al. | 701/3 |
| 2002/0140578 | A1 | 10/2002 | Price | |
| 2003/0060940 | A1 * | 3/2003 | Humbard et al. | 701/3 |
| 2004/0141170 | A1 * | 7/2004 | Jamieson et al. | 356/5.01 |
| 2004/0183698 | A1 * | 9/2004 | Rouquette et al. | 340/972 |
| 2004/0236481 | A1 | 11/2004 | Saint-Aroman et al. | |
| 2005/0216138 | A1 * | 9/2005 | Turung | 701/3 |
| 2007/0088492 | A1 | 4/2007 | Bitar et al. | |
| 2007/0138345 | A1 * | 6/2007 | Shuster | 244/186 |
| 2007/0225876 | A1 * | 9/2007 | Caillaud et al. | 701/16 |
| 2007/0290918 | A1 * | 12/2007 | Filias | G05D 1/0646 342/29 |
| 2008/0154447 | A1 * | 6/2008 | Spinelli | 701/7 |
| 2008/0177432 | A1 | 7/2008 | Deker et al. | |
| 2008/0221745 | A1 * | 9/2008 | Diamandis et al. | 701/3 |
| 2009/0030564 | A1 * | 1/2009 | Peterson | 701/3 |
| 2009/0105890 | A1 | 4/2009 | Jones et al. | |
| 2010/0161156 | A1 * | 6/2010 | Coulmeau et al. | 701/3 |
| 2010/0161160 | A1 * | 6/2010 | Wilson et al. | 701/15 |

FOREIGN PATENT DOCUMENTS

| | | |
|---|---|---|
| FR | 2906921 | 4/2008 |
| GB | 2453854 | 4/2009 |
| WO | WO 2008/130453 | 10/2008 |

OTHER PUBLICATIONS

Singapore Search Report and Written Opinion dated Sep. 11, 2013 in Singapore Application No. 201207518-0.

* cited by examiner

2D MOVING MAP DISPLAY

GLIDE PATH PROFILE

DETERMINING LANDING SITES FOR AIRCRAFT

TECHNICAL FIELD

The present disclosure relates generally to aviation of aircraft and, more particularly, to systems and methods for determining landing sites for aircraft.

BACKGROUND

In-flight emergencies that result in off-airport landings can result in the loss of life and property. The problem of selecting a suitable emergency landing site is a complex problem that has been exacerbated by the continued development of previously undeveloped, underdeveloped, and/or unoccupied areas. During an in-flight emergency, pilots have been limited to using their planning, experience, vision, and familiarity with a given area to select an emergency landing site.

During an emergency condition, a pilot may have little time to determine that an emergency landing needs to be executed, to find or select a suitable landing site, to execute other aircraft emergency procedures, to prepare passengers, and to then pilot the aircraft to the selected landing site. Thus, management of an in-flight emergency requires timely and accurate decision making processes to protect not only lives onboard the aircraft, but also to protect lives and property on the ground and to prevent a complete loss of the aircraft.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to an embodiment of the present disclosure, a method for determining a landing site for an aircraft includes receiving flight data corresponding to a flight path. The method further can include identifying at least one landing site proximate to the flight path, generating a spanning tree between the at least one landing site and the flight path, and storing the spanning tree in a data storage device. According to some embodiments, the landing sites are determined in real-time. Additionally, the landing sites may be determined at the aircraft or at a remote system or device in communication with the aircraft.

According to another embodiment, a routing tool for determining a landing site for an aircraft includes a database configured to store flight data corresponding to a flight path for the aircraft, and a routing module. The routing module is configured to receive the flight data, identify at least one landing site proximate to the flight path, generate a spanning tree between the at least one landing site and the flight path, and store the spanning tree in a data storage device.

According to another embodiment, a computer readable storage medium is disclosed. The computer readable medium has computer executable instructions stored thereon, the execution of which by a processor make a routing tool operative to receive flight data corresponding to a flight path, identify at least one landing site proximate to the flight path, generate a spanning tree between the at least one landing site and the flight path, store the spanning tree in a data storage device, detect an emergency at the aircraft during a flight of the aircraft, and in response to detecting the emergency, display the spanning tree for selection of a landing site.

The features, functions, and advantages discussed herein can be achieved independently in various embodiments of the present invention or may be combined in yet other embodiments, further details of which can be seen with reference to the following description and drawings.

DETAILED DESCRIPTION

Figure 1:
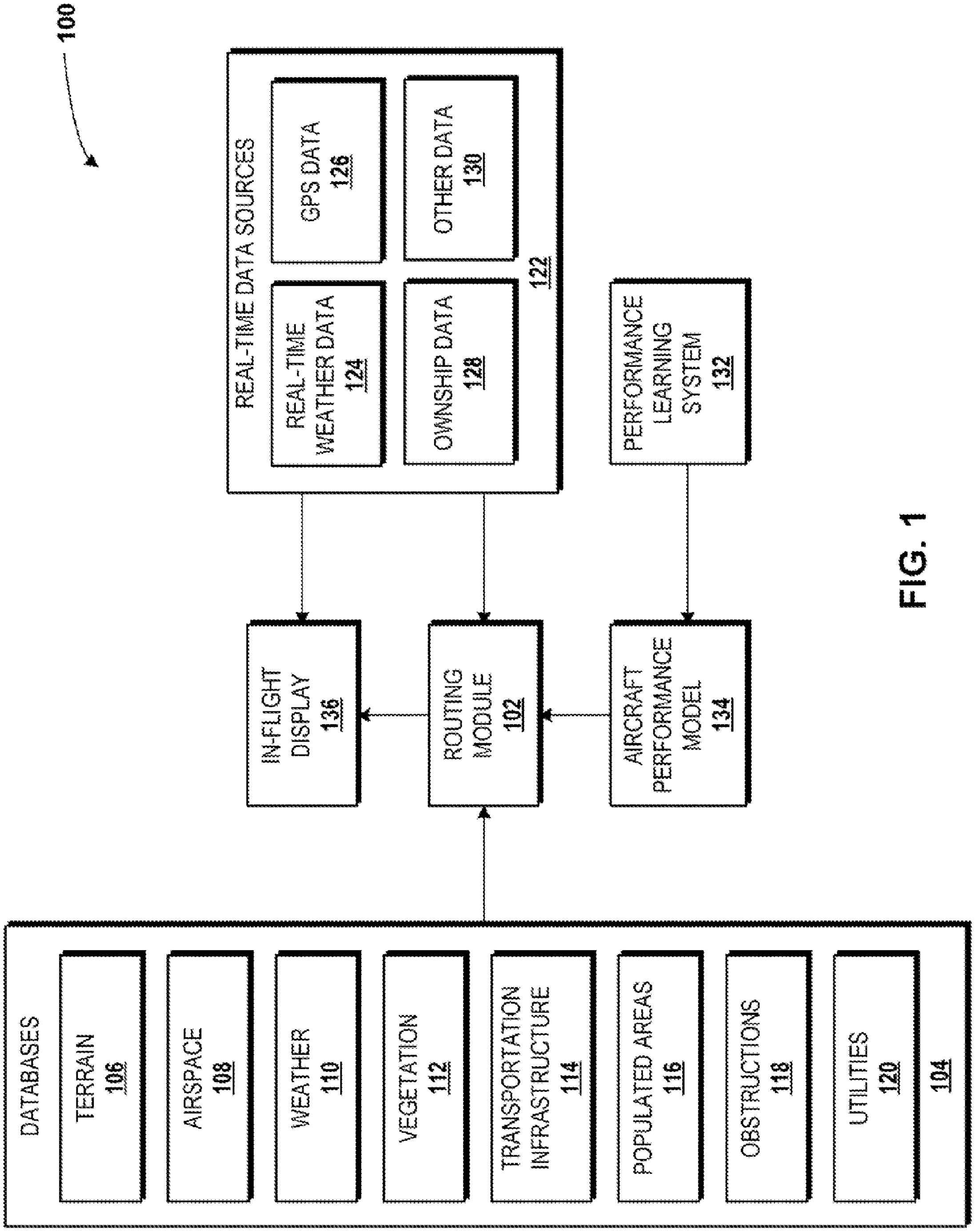
FIG. 1 schematically illustrates a block diagram of a routing tool, according to an exemplary embodiment.

The following detailed description is directed to systems, methods, and computer readable media for determining landing sites for aircraft. Utilizing the concepts and technologies described herein, routing methodologies and a routing tool may be implemented for identifying attainable landing sites within a dead stick or glide footprint for the aircraft. The identified attainable landing sites may include airport landing sites and off-airport landing sites.

According to embodiments described herein, the attainable landing sites are evaluated to allow identification and/or selection of a recommended or preferred landing site. In particular, the evaluation of the landing sites may begin with a data collection operation, wherein landing site data relating to the attainable landing sites and/or aircraft data relating to aircraft position and performance are collected. The landing site data may include, but is not limited to, obstacle data, terrain data, weather data, traffic data, population data, and other data, all of which may be used to determine a safe ingress flight path for each identified landing site. The aircraft data may include, but is not limited to, global positioning system (GPS) data, altitude, orientation, and airspeed data, glide profile data, aircraft performance data, and other information.

In some embodiments, a flight path spanning tree is generated for safe ingress flight paths to the determined attainable landing sites. The flight path spanning tree is generated from the landing site and is backed into the flight path. In some embodiments, the spanning trees are generated before or during flight, and can take into account a planned or current flight path, a known or anticipated glide footprint for the aircraft, banking opportunities, and detailed flight-time information. In some embodiments, the spanning trees can be accompanied by an optional countdown timer for each displayed branch of the spanning tree, i.e., each flight path to a landing site, the countdown timer being configured to provide a user with an indication as to how long the associated flight path remains available as a safe ingress option for the associated landing site.

According to various embodiments, collecting data, analyzing the data, identifying possible landing sites, generating spanning trees for each identified landing site, and selecting a landing site may be performed during a flight planning process, in-flight, and/or in real-time aboard the aircraft or off-board. Thus, in some embodiments aircraft personnel are able to involve Air Traffic Control (ATC), Airborne Operations Centers (ADCs), and/or Air Route Traffic Control Centers (ARTCCs) in the identification, analysis, and/or selection of suitable landing sites. The ATC, AOCs, and/or ARTCCs may be configured to monitor and/or control an aircraft involved in an emergency situation, if desired. These and other advantages and features will become apparent from the description of the various embodiments below.

Throughout this disclosure, embodiments are described with respect to manned aircraft and ground-based landing sites. While manned aircraft and ground-based landing sites provide useful examples for embodiments described herein, these examples should not be construed as being limiting in any way. Rather, it should be understood that some concepts and technologies presented herein also may be employed by unmanned aircraft as well as other vehicles including spacecraft, helicopters, gliders, boats, and other vehicles. Furthermore, the concepts and technologies presented herein may be used to identify non-ground-based landing sites such as, for example, a landing deck of an aircraft carrier.

In the following detailed description, references are made to the accompanying drawings that form a part hereof and that show, by way of illustration, specific embodiments or examples. In referring to the drawings, like numerals represent like elements throughout the several figures.

FIG. 1 schematically illustrates a block diagram of a routing tool 100, according to an exemplary embodiment. The routing tool 100 can be embodied in a computer system such as an electronic flight bag (EFB); a personal computer (PC); a portable computing device such as a notepad, netbook or tablet computing device; and/or across one or more computing devices, for example, one or more servers and/or web-based systems. As mentioned above, some, none, or all of the functionality and/or components of the routing tool 100 can be provided by onboard systems of the aircraft or by systems located off-board.

The routing tool 100 includes a routing module 102 configured to provide the functionality described herein including, but not limited to, identifying, analyzing, and selecting a safe landing site. It should be understood that the functionality of the routing module 102 may be provided by other hardware and/or software instead of, or in addition to, the routing module 102. Thus, while the functionality described herein primarily is described as being provided by the routing module 102, it should be understood that some or all of the functionality described herein may be performed by one or more devices other than, or in addition to, the routing module 102.

The routing tool 100 further includes one or more databases 104. While the databases 104 are illustrated as a unitary element, it should be understood that the routing tool 100 can include a number of databases. Similarly, the databases 104 can include a memory or other storage device associated with or in communication with the routing tool 100, and can be configured to store a variety of data used by the routing tool 100. In the illustrated embodiment, the databases 104 store terrain data 106, airspace data 108, weather data 110, vegetation data 112, transportation infrastructure data 114, populated areas data 116, obstructions data 118, utilities data 120, and/or other data (not illustrated).

The terrain data 106 represents terrain at a landing site, as well as along a flight path to the landing site. As will be explained herein in more detail, the terrain data 106 can be used to identify a safe ingress path to a landing site, taking into account terrain, e.g., mountains, hills, canyons, rivers, and the like. The airspace data 108 can indicate airspace that is available for generating one or more flight paths to the landing sites. The airspace data 108 could indicate, for example, a military installation or other sensitive area over which the aircraft cannot legally fly.

The weather data 110 can include data indicating weather information, particularly historical weather information, trends, and the like at the landing site, as well as along a flight path to the landing site. The vegetation data 112 can include data indicating the location, height, density, and other aspects of vegetation at the landing site, as well as along a flight path to the landing site, and can relate to various natural obstructions including, but not limited to, trees, bushes, vines, and the like, as well as the absence thereof. For example, a large field may appear to be a safe landing site, but the vegetation data 112 may indicate that the field is an orchard, which may preclude usage of the field for a safe landing.

The transportation infrastructure data 114 indicates locations of roads, waterways, rails, airports, and other transportation and transportation infrastructure information. The transportation infrastructure data 114 can be used to identify a nearest airport, for example. This example is illustrative, and should not be construed as being limiting in any way. The populated areas data 116 indicates population information associated with various locations, for example, a landing site and/or areas along a flight path to the landing site. The populated areas data 116 may be important when considering a landing site as lives on the ground can be taken into account during the decision process.

The obstructions data 118 can indicate obstructions at or around the landing site, as well as obstructions along a flight path to the landing site. In some embodiments, the obstructions data include data indicating manmade obstructions such as power lines, cellular telephone towers, television transmitter towers, radio towers, power plants, stadiums, buildings, and other structures that could obstruct a flight path to the landing site. The utilities data 120 can include data indicating any utilities at the landing site, as well as along a flight path to the landing site. The utilities data 120 can indicate, for example, the locations, size, and height of gas pipelines, power lines, high-tension wires, power stations, and the like.

The other data can include data relating to pedestrian, vehicle, and aircraft traffic at the landing sites and along a flight path to the landing sites; ground access to and from the landing sites; distance from medical resources; combinations thereof; and the like. Furthermore, in some embodiments, the other data stores flight plans submitted by a pilot or other aircraft personnel. It should be understood that the flight plans may be submitted to other entities, and therefore may be stored at other locations instead of, or in addition to, the databases 104.

The routing tool 100 also can include one or more real-time data sources 122. The real-time data sources 122 can include data generated in real-time or near-real-time by various sensors and systems of or in communication with the aircraft. In the illustrated embodiment, the real-time data sources include real-time weather data 124, GPS data 126, ownship data 128, and other data 130.

The real-time weather data 124 includes real-time or near-real-time data indicating weather conditions at the aircraft, at one or more landing sites, and along flight paths terminating at the one or more landing sites. The GPS data 126 provides real-time or near-real-time positioning information for the aircraft, as is generally known. The ownship data 128 includes real-time navigational data such as heading, speed, altitude, trajectory, pitch, yaw, roll, and the like. The ownship data 128 may be updated almost constantly such that in the event of an engine or other system failure, the routing module 102 can determine and/or analyze the aircraft trajectory. The ownship data 128 further can include real-time or near-real-time data collected from various sensors and/or systems of the aircraft and can indicate airspeed, altitude, attitude, flaps and gear indications, fuel level and flow, heading, system status, warnings and indicators, and the like, some, all, or none of which may be relevant to identifying, analyzing, and/or selecting a landing site as described herein. The other data 130 can include, for example, data indicating aircraft traffic at or near a landing site, as well as along a flight path to the landing site, real-time airport traffic information, and the like.

The routing tool 100 also can include a performance learning system 132 (PLS). The PLS 132 also may include a processor (not illustrated) for executing software to provide the functionality of the PLS 132. In operation, the processor uses aircraft-performance algorithms to generate an aircraft performance model 134 from flight maneuvers. In some embodiments, the PLS 132 is configured to execute a model generation cycle during which the performance model 134 is determined and stored. The model generation cycle can begin with execution of one or more maneuvers, during which data from one or more sensors on or in communication with the aircraft can be recorded. The recorded data may be evaluated to generate the aircraft performance model 134, which can then represent, for example, glide paths of the aircraft under particular circumstances, fuel consumption during maneuvers, change in speed or altitude during maneuvers, other performance characteristics, combinations thereof, and the like. In some embodiments, the performance model 134 is continually or periodically updated. As will be explained in more detail below, the performance model 134 may be used to allow a more accurate evaluation of landing sites as the evaluation can be based upon actual aircraft performance data, as opposed to assumptions based upon current operating parameters and the like.

During operation of the aircraft, data retrieved from the databases 104, data retrieved from the real-time data sources 122, and/or the aircraft performance model 134 can be used by the routing tool 100 to provide multiple layers of data on an in-flight display 136 of the aircraft. The in-flight display 136 may include any suitable display of the aircraft such as, for example, a display of the EFB, an NAV, a primary flight display (PFD), a heads up display (HUD), or a multifunction display unit (MDU), an in-flight display 136 for use by aircraft personnel. Additionally, or alternatively, the data can be passed to the routing module 102 and/or to off-board personnel and systems, to identify safe landing sites, to analyze the safe landing sites, and to select a landing site and a flight path to the safe landing sites. In some embodiments, the landing site and flight path information can be passed to the in-flight display 136 or another display. As will be described below, the in-flight display 136 or another display can provide a moving map display for mapping the landing sites and flight paths thereto, displaying glide profile views, weather, obstructions, time remaining to follow a desired flight path, and/or other data to allow determinations to be made by aircraft personnel. Additionally, as mentioned above, the data can be transmitted to off-board personnel and/or systems.

Figure 2A:
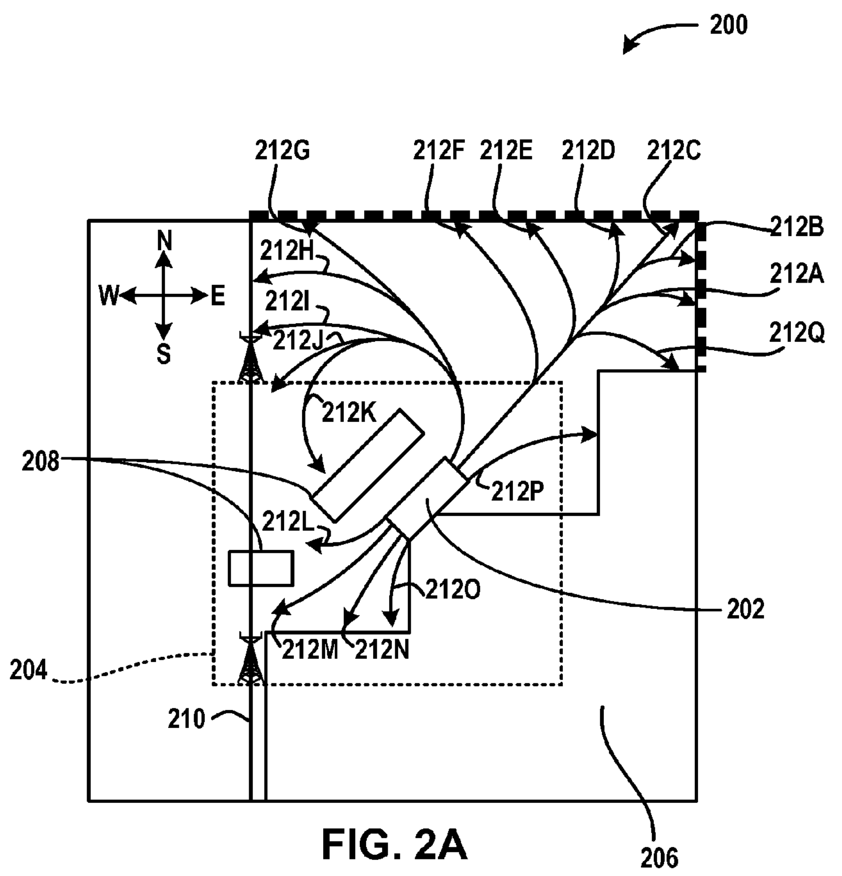
FIG. 2A illustrates an exemplary landing site display, according to an exemplary embodiment.

Turning now to FIG. 2A, additional details of the routing tool 100 are provided, according to an exemplary embodiment. FIG. 2A illustrates an exemplary landing site display 200, which can be generated by the routing tool 100. The landing site display 200 includes a landing site 202, and an area surrounding the landing site 202. The size of the landing site display 200 can be adjusted based upon data included in the display 200 and/or preferences. The landing site 202 can include an airport runway, a field, a highway, and/or another suitable airport or off-airport site. In the illustrated embodiment, the landing site 202 is illustrated within a landing zone grid 204, which graphically represents the distance needed on the ground to safely land the aircraft.

The illustrated landing site 202 is bordered on at least three sides with obstructions that prevent a safe ingress by the aircraft. In particular, an area of tall vegetation 206, e.g., trees, borders the landing site 202 on the south and east sides, preventing the aircraft from approaching the landing site 202 from the south or east. Additionally, buildings 208 and power lines 210 border the landing site 202 along the west side and northwest sides. These manmade and naturally occurring features limit the possible approach paths for the aircraft. As illustrated, a spanning tree showing allowed ingress flight paths 212A-Q are shown. In the illustrated embodiment, the aircraft can land at the landing site 202 only by approaching via flight paths 212A-G, while flight paths 212H-Q are obstructed. The generation and use of spanning trees such as the spanning tree illustrated in FIG. 2A will be described in more detail below.

Figure 2B:
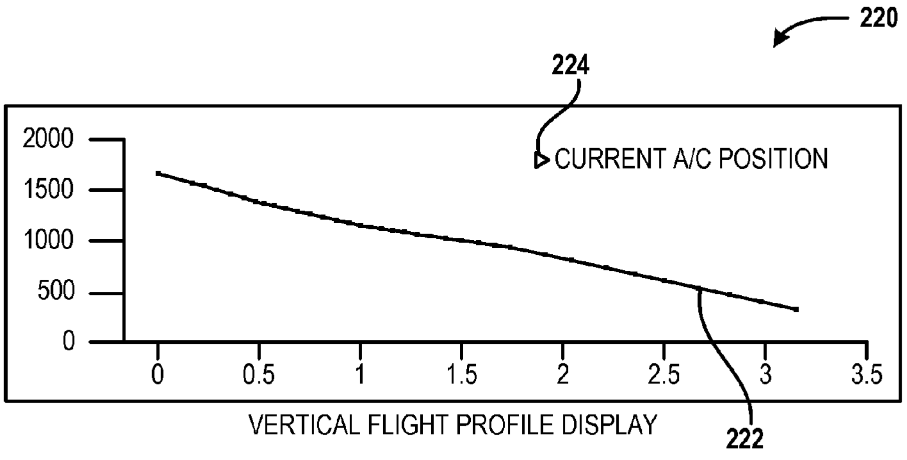
FIG. 2B illustrates an exemplary glide profile view display, according to an exemplary embodiment.

FIG. 2B illustrates an exemplary glide profile view display 220, according to an exemplary embodiment. In some embodiments, the glide profile view display 220 is generated by the routing tool 100 and displayed with the landing site display 200 to indicate a glide profile 222 required to be met or exceeded by an aircraft in order to successfully and safely land at the landing site 202. The glide path 222 is plotted as an altitude versus horizontal distance traveled along the path. The glide profile view display 220 includes an indication 224 of the current aircraft position. As illustrated in FIG. 2B, the aircraft currently has more than sufficient altitude to reach the landing site 202. In fact, in the illustrated embodiment, the aircraft is illustrated as being about nine hundred feet above the minimum altitude glide profile. Thus, the pilot of the aircraft will need to descend relatively quickly to successfully execute the landing. This example is illustrative, and is provided for purposes of illustrating the concepts disclosed herein.

Figure 3A:
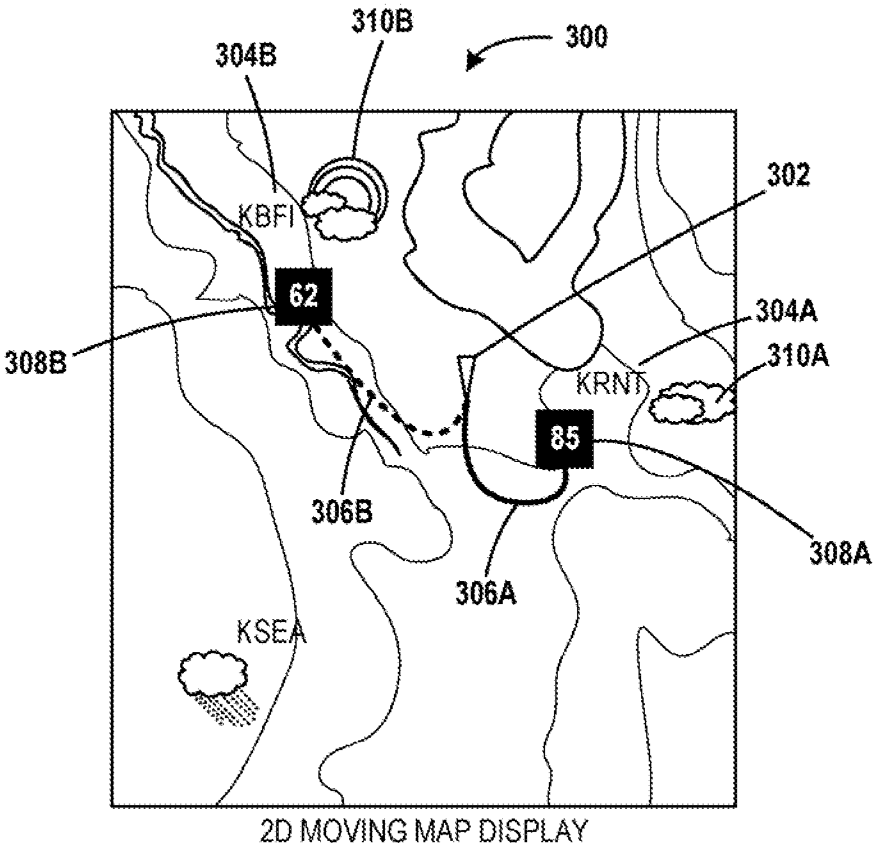
FIG. 3A illustrates a screen display for an exemplary embodiment of the moving map display.
Figure 3B:
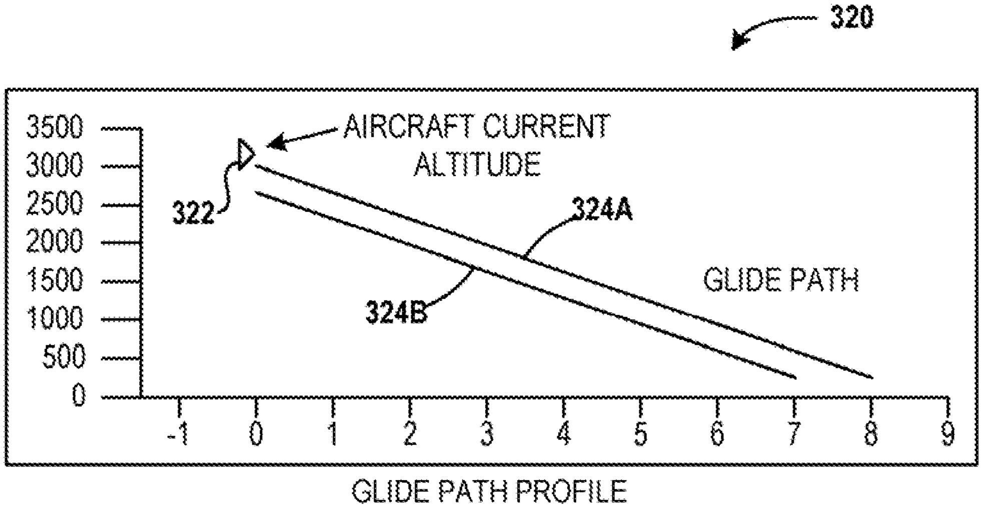
FIG. 3B illustrates an exemplary glide profile view display, according to an exemplary embodiment

Turning now to FIGS. 3A-3B, exemplary screen displays are illustrated according to exemplary embodiments. In particular, FIG. 3A illustrates a screen display 300 for an exemplary embodiment of the moving map display. The screen display 300 can be displayed on the in-flight display 136, a computer display of an onboard computer system, a display of an off-board computer system, or another display. The screen display 300 illustrates a current position 302 of an aircraft that is about to make an unplanned landing, e.g., an emergency landing. The routing tool 100 identifies two candidate landing sites 304A, 304B. Additionally, the routing tool 100 determines, based upon any of the data described above, ingress paths 306A, 306B for the landing sites 304A-B. In the illustrated embodiment, the ingress path 306A is a preferred ingress path as it leads to the preferred landing site 304A, and the ingress pat 306B is a secondary ingress path as it leads to the secondary landing site 304B. This embodiment is exemplary.

The ingress paths 306A-B take into account any of the data described herein including, but not limited to, the data stored at the database 104. Additionally, the routing tool 100 is configured to access the real-time data sources 122, and can display time indications 308A, 308B, which indicate a time remaining by which the aircraft must commit to the respective ingress path 306A, 306B in order to safely follow the proposed route. In FIG. 3A, the time indications 308A, 308B are displayed as numbers over respective landing sites. In the illustrated embodiment, the numbers correspond to numbers of seconds remaining for the aircraft to commit to the associated landing sites 304A, 304B and ingress paths 306A, 306B and still make a safe landing. Thus, the numbers represent a number of seconds left before the ingress paths 306A-B are invalid, assuming the aircraft remains on a course substantially equivalent to its current course. In FIG. 3A, the recommended route 306A remains available for 85 seconds, while the second route 306B remains available for 62 seconds, i.e., 23 seconds less than the recommended route 306A.

Additionally displayed on the screen display 300 are weather indications 310A, 310B, corresponding to weather at the landing sites 304A, 304B, respectively. The weather indications 310A-B correspond to overcast skies at the landing site 304A, and clear skies at the landing site 304B. These indications are exemplary, and should not be construed as being limiting in any way. The weather at prospective landing sites 304A-B may be important information, as good visibility is often vital in an emergency landing situation. Similarly, certain weather conditions such as high winds, turbulence, thunderstorms, hail, and the like can put additional stress on the aircraft and/or the pilot, thereby complicating landing of what may be an already crippled aircraft.

Turning now to FIG. 3B, a glide profile view display 320 is illustrated, according to an exemplary embodiment. As explained above with reference to FIG. 2B, the routing tool 100 can be configured to provide the glide profile view display 320 with the moving map display 300 to provide aircraft or other personnel with a better understanding of the available options. The glide profile view display 320 includes a current aircraft position indicator 322. Also illustrated on the glide profile view display 320 are representations 324A, 324B of glide paths needed to successfully ingress to the landing sites 304A, 304B of FIG. 3A. The representations 324A, 324B ("glide paths") correspond, respectively, to the ingress paths 306A, 306B of FIG. 3A, and show the altitude needed to arrive safely at the landing sites 304A, 304B, respectively. As shown in FIG. 3B, the aircraft currently has sufficient altitude to approach both landing sites 304A-B.

The glide profile view display 320 allows the pilot to instantaneously visualize where the aircraft is with respect to the available landing sites 304A-B and/or ingress paths 306A-B in the vertical (altitude) plane. Thus, the routing module 102 allows the pilot to more quickly evaluate the potential landing sites 306A-B by continuously displaying the aircraft's vertical position above or below the approach path to each site. This allows at-a-glance analysis of landing site feasibility and relative merit.

The glide profile view display 320 can be an active or dynamic display. For example, the glide profile view display 320 can be frequently updated, for example, every second, 5 seconds, 10 seconds, 1 minute, 5 minutes, or the like. Potential landing sites 304A-B that are available given the aircraft's position and altitude can be added to and/or removed from the glide profile view display 320 as the aircraft proceeds along its flight path. Thus, if an emergency situation or other need to land arises, the pilot can evaluate nearby landing sites 306A-B and choose from the currently available glide paths 324A-B, which are continuously calculated and updated. In some embodiments, the descent glide 324A-B are updated and/or calculated from a database loaded during a flight planning exercise.

The aircraft's current flight path can be connected to the best available ingress path 306A-B by propagating the aircraft to align in position and heading to the best ingress path 306A or 306B. In the illustrated embodiment, the secondary or alternate route 306B requires more energy than the energy required for the preferred route 306A. In the case of an aircraft that is gliding dead stick, the alternate route 306B requires that the aircraft must start at a higher altitude than the altitude required for aircraft to glide along the preferred route 306A.

Figure 4:
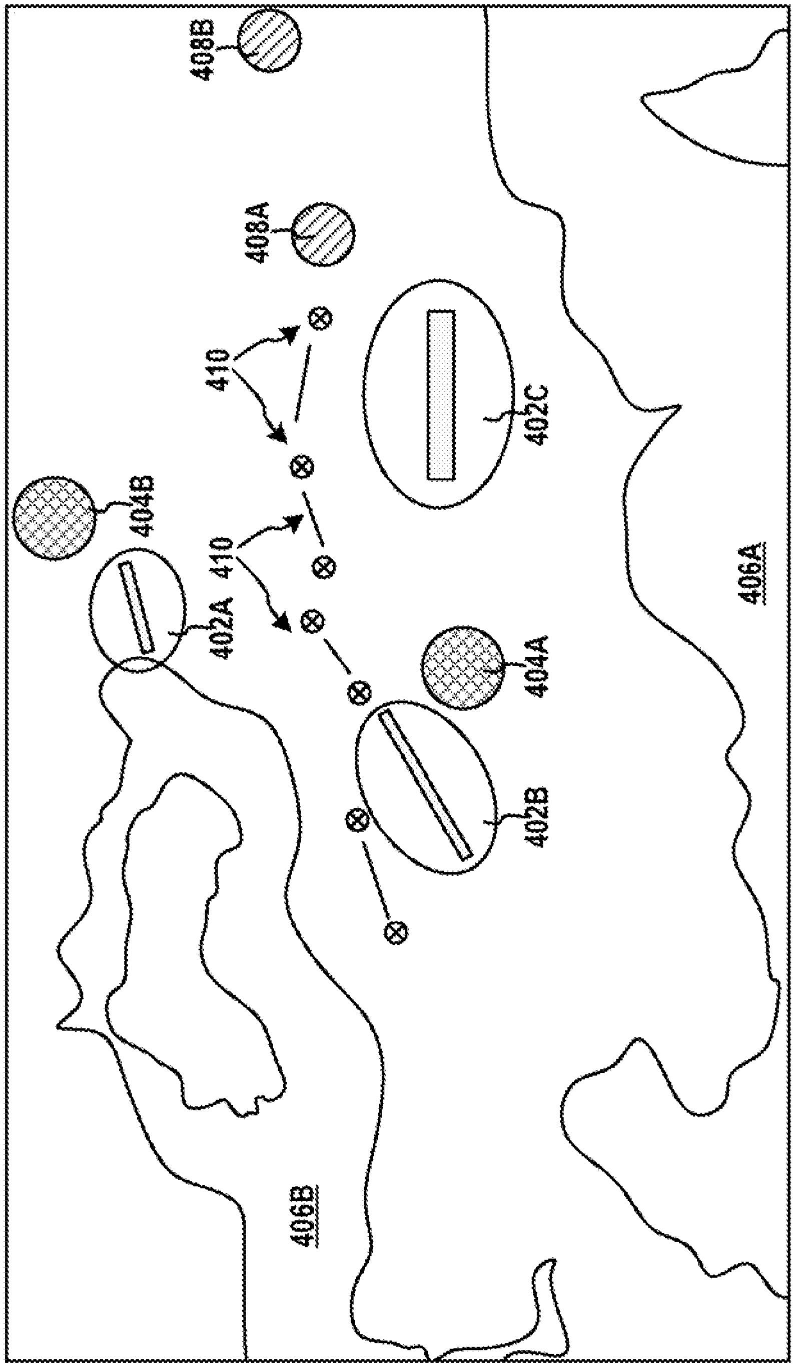
FIG. 4 illustrates a map display generated by the routing tool, according to an exemplary embodiment.

Turning now to FIG. 4, additional details of the routing tool are illustrated, according to an exemplary embodiment. FIG. 4 shows map display 400 generated by the routing tool 100, according to an exemplary embodiment. The map display 400 includes three possible landing sites 402A, 402B, 402C that may be chosen during an emergency situation, such as, for example, an in-flight fire, an engine failure, a critical systems failure, a medical emergency, a hijacking, or any other situation in which an expeditious landing is warranted.

The map display 400 graphically illustrates obstructions and features that may be important when considering an emergency landing at a potential landing site 402A-C. The illustrated map display 400 shows golf courses 404A, 404B, bodies of water 406A, 406B, fields 408A, 408B, and other obstructions 410 such as power lines, bridges, ferry routes, buildings, towers, population centers, and the like. In the illustrated embodiment, the potential landing sites 402A-C are airports. As is generally known, a landing zone for an airport has constraints on how and where touchdown can occur. In particular, if an aircraft needs a distance D after touchdown to come to a complete stop, the aircraft needs to touchdown at a point on the runway, and heading in a direction along the runway, such that there is at least the distance D between the touchdown point and the end of the runway or another obstruction. Therefore, a pilot or other aircraft personnel may need this information to arrive at the landing site 402A-C in a configuration that makes a safe landing possible. Typically, however, the pilot or other aircraft personnel do not have time during an emergency situation to determine this information. Additionally, the level of detail needed to determine this information may not be available from a typical aviation map.

Figure 5B:
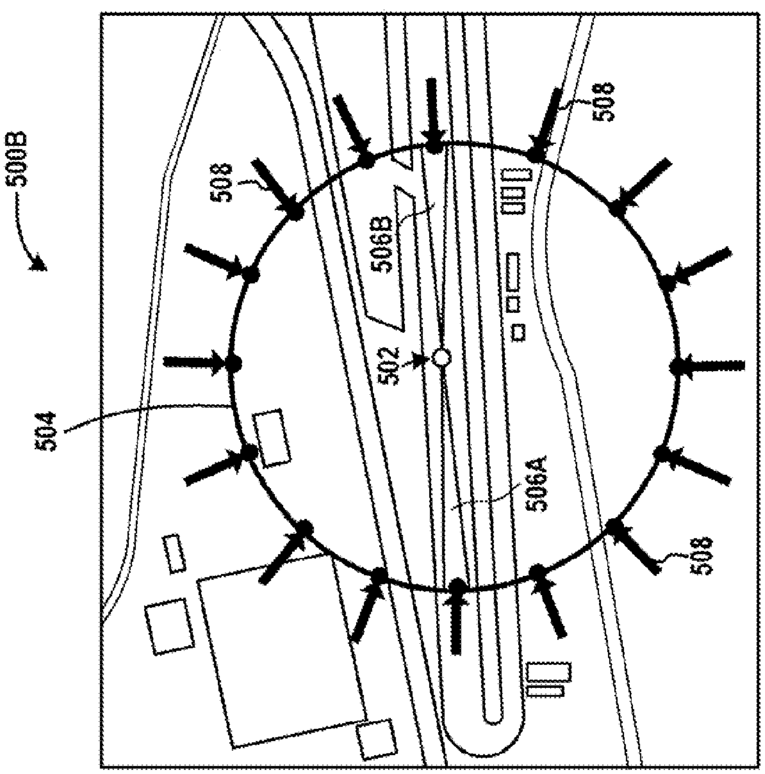
FIGS. 5A-5B illustrate landing site maps, according to exemplary embodiments.
Figure 5A:
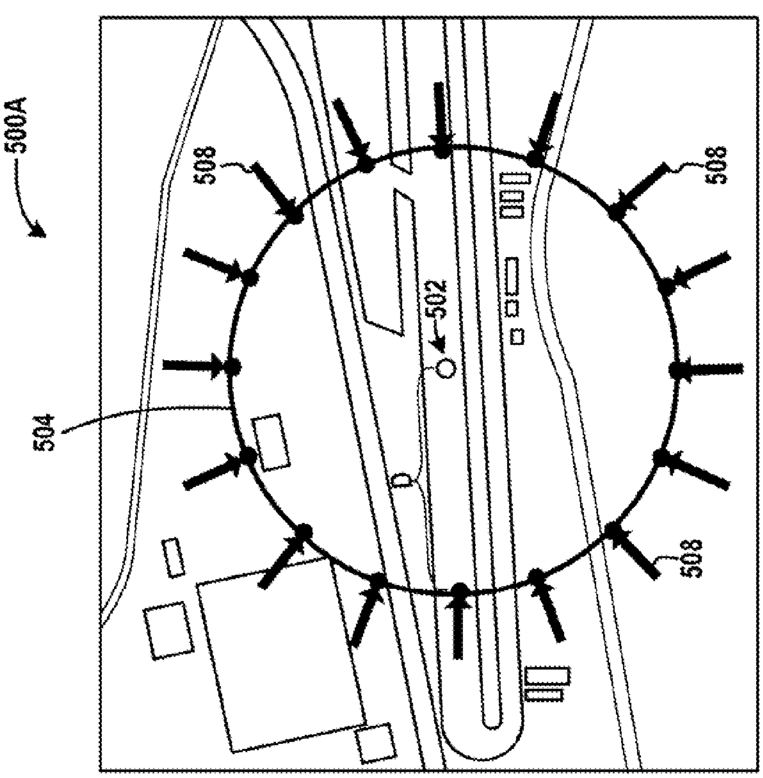

FIGS. 5A-5B illustrate this problem. FIG. 5A illustrates a landing site map 500A, according to an exemplary embodiment. The landing site map 500A includes a touchdown point 502. The touchdown point 502 is surrounded by a circle 504 with a radius D. The radius D corresponds to the distance needed from touchdown to bring the aircraft to a complete stop, and therefore represents a distance needed form the touchdown point 502 to a stopping point to safely land the aircraft. Thus, the circle 504 illustrates the possible points at which the aircraft could stop if the aircraft lands at the touchdown point 502. As can be seen in FIG. 5A, only a small number headings 506 are safe to execute a landing at the touchdown point 502.

Turning now to FIG. 5B, another landing site map 500B is illustrated, according to an exemplary embodiment. FIG. 5B illustrates two subarcs 506A, 506B, corresponding to headings 508 along the circle 504 at which the aircraft can land safely at the illustrated touchdown point 502. The illustrated subarcs 506A-B and circle 504 are exemplary. In accordance with concepts and technologies described herein, the orientation of the subarcs 506A-B are determined and stored at the routing tool 100, for example, during flight planning or during ingress to the landing site during an emergency condition.

The routing module 102 is configured to determine the subarcs 506A-B by beginning at the touchdown point 502 and working backwards toward the current location. Based upon a knowledge of constraints on the landing area, e.g., terrain, obstacles, power lines, buildings, vegetation, and the like, the routing module 102 limits the touchdown points to the subarcs 506A-B. The routing module 102 determines these subarcs 506A-B based upon the known aircraft performance model 134 and/or knowledge of parameters relating to aircraft performance in engine-out conditions. In particular, the routing module 102 executes a function based upon the zero-lift drag coefficient and the induced drag coefficient. With knowledge of these coefficients, the weight of the aircraft, and the present altitude, the routing module 102 can determine a speed at which the aircraft should be flown during ingress to the landing site and/or the touchdown point 502.

Additionally, the routing module 102 determines how the aircraft needs to turn to arrive at the landing site with the correct heading for a safe landing. The routing module 102 is configured to use standard rate turns of three-degrees per second to determine how to turn the aircraft and to verify that the aircraft can arrive safely at the landing site with the correct heading, speed, and within a time constraint. It should be understood that any turn rate including variable rates can be used, and that the performance model 134 can be used to tailor these calculations to known values for the aircraft. The routing module 102 outputs bank angle, which is displayed in the cockpit, to instruct the pilot as to how to execute turns to arrive at the landing site safely. In practice, the aircraft flies along the ingress path at the maximum lift over drag (L/D) ratio. Meanwhile, the routing module 102 supplies the pilot with the bank angle required to approach the landing site along the correct heading for the known subarcs 506A-B. The bank angles are displayed in the cockpit so the pilot can accurately fly to the landing site without overshooting or undershooting the ideal flight path.

Figure 6A:
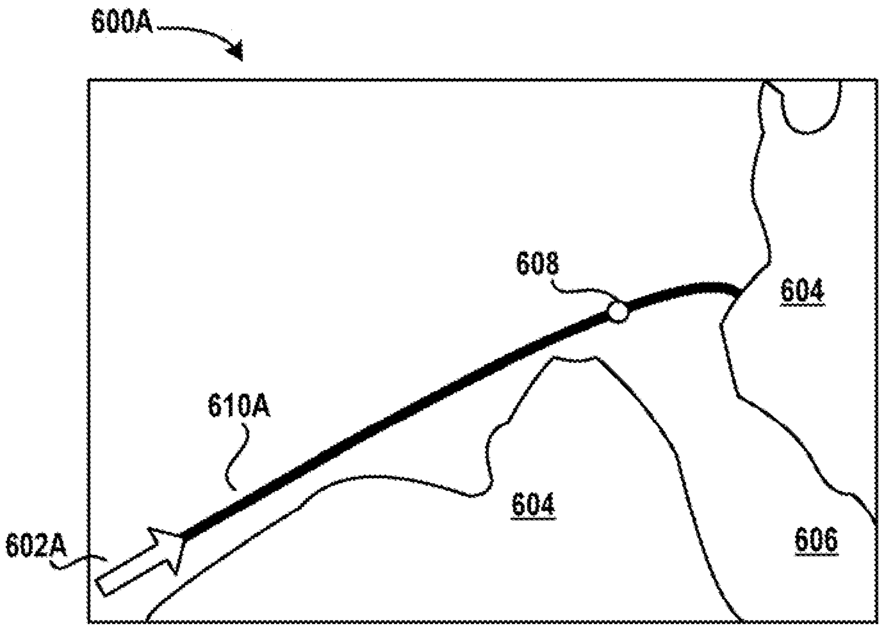
FIGS. 6A-6B schematically illustrate flight path planning methods, according to exemplary embodiments.
Figure 6B:
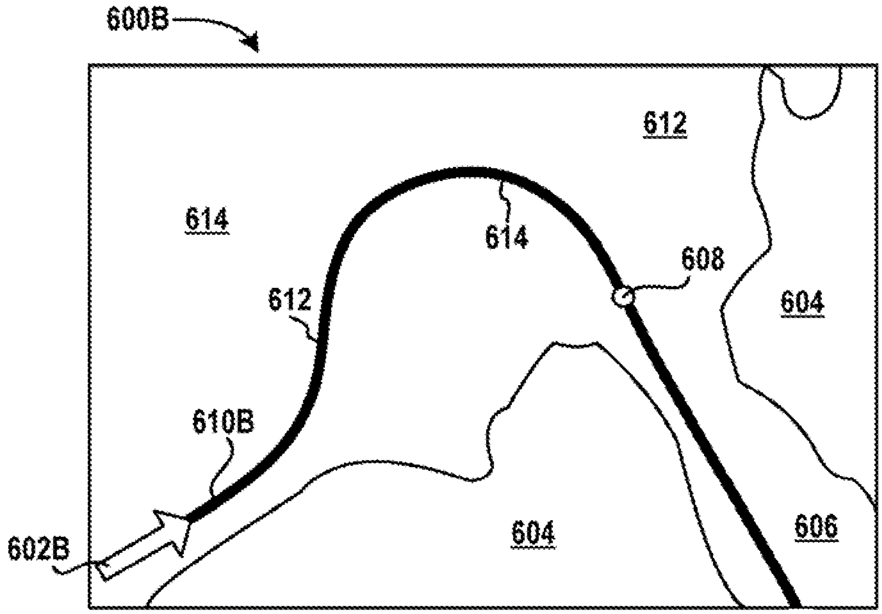

Turning now to FIGS. 6A-6B, the logic employed by the routing module 102 will be described in more detail. Some routing algorithms build spanning trees rooted at the origin of the path. Locations in space are added to the spanning tree when the algorithm knows the minimal cost route to that point in space. Most applications of the algorithm stop when a destination is added to the spanning tree. The routing module 102 of the routing tool 100, on the other hand, is configured to build spanning trees that are rooted at one or more touchdown points 502. The spanning trees grow from the touchdown points 502 outward. An example of such a spanning tree is illustrated above in FIG. 2A. In building the spanning trees, the routing module 102 minimizes altitude changes while moving away from the touchdown points 502.

Once the spanning tree is built, the routing tool 100 or the routing module 102 can query the spanning tree from any location and know what minimum altitude is needed to reach the associated touchdown point 502 from that location. Additionally, by following a branch of the spanning tree, the routing module 102 instantly ascertains the route that will minimize altitude loss during ingress to the landing site.

In some embodiments of the routing tool 100 and/or the routing module 102 disclosed herein, the spanning trees for each landing site along a flight path may be generated in real-time, and can be pre-calculated during a flight planning stage and/or computed in real-time or near-real-time during an emergency situation. With the spanning tree, the routing module 102 can determine the minimal cost path to the origin, wherein cost may be a function of time, energy, and/or fuel.

FIGS. 6A-6B schematically illustrate flight path planning methods, according to exemplary embodiments. Referring first to FIG. 6A, a map 600A schematically illustrates a first method for planning a flight path. On the map 600A, an ownship indicator 602A shows the current position and heading of an aircraft. The map 600A also indicates terrain 604 that is too high for the aircraft to fly over in the illustrated embodiment. For purposes of illustration, it is assumed herein that the aircraft needs to turn into the canyon 606, the beginning of which is represented by the indication 608. Using a standard path planning algorithm, a flight path 610A is generated from the current position and heading 602A. The algorithm essentially searches for the minimal cost route to the entrance point indicated by the indication 608. The algorithm will seek to extend the route for the aircraft from that location. Unfortunately, from the entrance point indicated by the indication 608, the aircraft will not be able to complete the turn without hitting the terrain 604.

Turning now to FIG. 6B, a map 600B schematically illustrates a second method for planning a flight path. More particularly, the map 600B schematically illustrates a method used by the routing module 102, according to an exemplary embodiment. The algorithm used in FIG. 6B begins at the entrance point indicated by the indication 608, and works back to the current position and heading indicated by the ownship indicator 602B. Thus, the algorithm determines that in order to enter the canyon 606, the aircraft must fly along the flight path 610B. In particular, the aircraft must first incur cost making a left turn 612, and then make a long costly right turn 614 to line up with the canyon 606. It should be understood that the scenarios illustrated in FIGS. 6A-6B are exemplary.

Figure 7A:
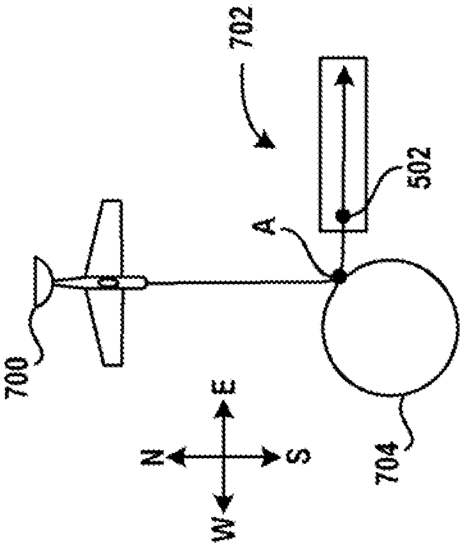
FIGS. 7A-7B illustrate additional details of the routing tool, according to exemplary embodiments.

Turning now to FIG. 7A, additional details of the routing tool 100 are described in more detail. In FIG. 7A, an aircraft 700 is flying south and is attempting to land on an east-west landing zone 702. The proximity of the aircraft 700 to the landing zone 702 makes a safe ingress by way of a direct 90° turn at point A unsafe and/or impossible. In accordance with the concepts and technologies disclosed herein, the routing module 102 begins at the landing zone 702 and works back to the aircraft 700. In so doing, the routing module could determine in the illustrated embodiment, that the aircraft 700 must make a 270° turn beginning at point A and continuing along the flight path 704 to arrive at the landing zone 702 in the correct orientation. Thus, the aircraft 700 could cross point A twice during the approach, though this is exemplary. As is generally known, standard path planning algorithms are designed to accommodate only one path, and a path that traverses any particular point in space only once. Thus, the flight path 704 would not be generated using a standard path planning algorithm.

Figure 7B:
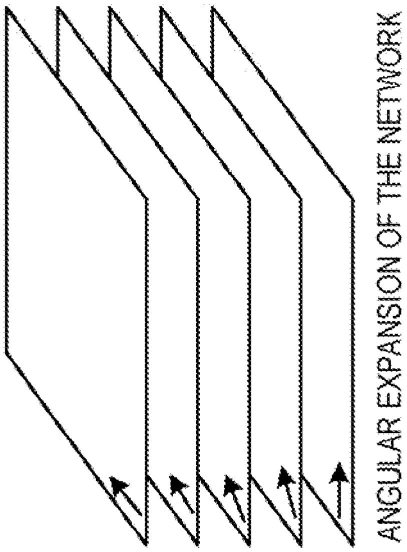

According to exemplary embodiments, the routing module 102 includes path planning functionality that adds an angular dimension to the space. Therefore, instead of searching over a two-dimensional space, the algorithm works in three dimensions, wherein the third dimension is aircraft heading. For the flight path 704 illustrated in FIG. 7A, the flight paths 704 can cross over themselves as long as the multiple routes over a point are at different headings. The functionality of the three dimensional approach is illustrated generally in FIG. 7B.

Figure 8:
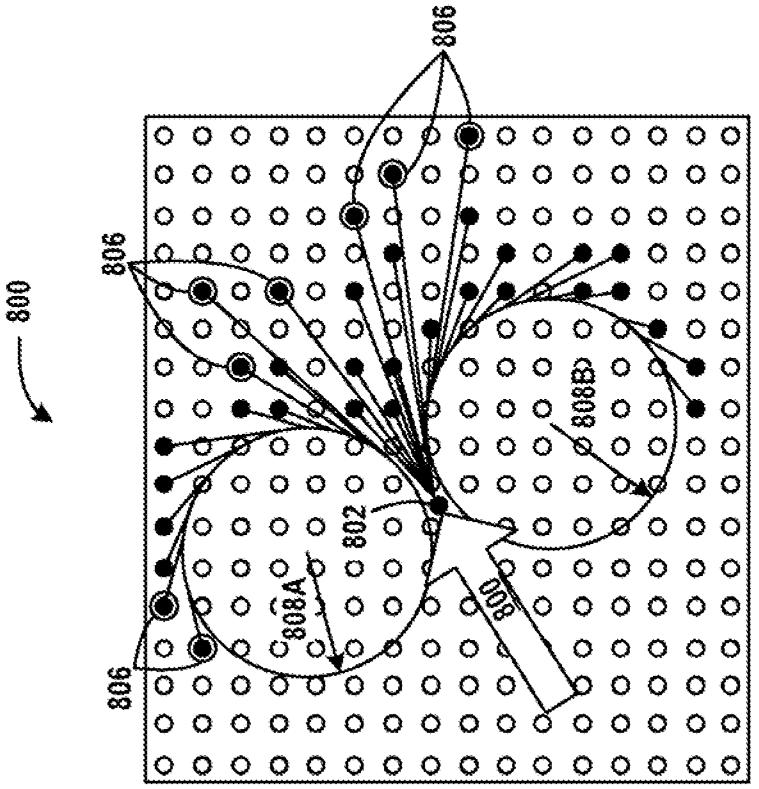
FIG. 8 illustrates the application of turn constraints in an update phase of the path planning algorithm, according to an exemplary embodiment.

Turning now to FIG. 8, additional details of the routing tool 100 are described in detail. FIG. 8 generally illustrates the application of turn constraints in an update phase of the path planning algorithm. When a point in space is added to the spanning tree, the algorithm attempts to extend the path to neighboring points in the space. For turn constrained situations, the reachable neighbors are constrained as shown in FIG. 8. A current position and heading 800 of an aircraft at a point 802 that was just added to the spanning tree is illustrated in FIG. 8. The points 806 represent neighboring points that the algorithm will attempt to reach when extending the path.

The turn constraints are not limited to any particular turn radius. The turn radius 808A can be different than the turn radius 808B. The algorithm can try different turn radii in an attempt to minimize altitude loss. For example, if the aircraft is trying to reach a point behind its current position. It could use a controlled turn that has less altitude loss per degree of turn. It could also make a tighter turn with more altitude loss per degree of turn. The longer distance of the controlled turn could result in more total altitude loss than the shorter tighter turn. If the tighter turn produces less total altitude loss, the algorithm will use the tighter turn.

While relatively computationally expensive, generation of the spanning trees can be performed pre-departure. A database of spanning trees rooted at various landing locations and under various conditions can be loaded into the aircraft for use during flight. At any point during the flight the current aircraft position and heading can be compared with spanning trees rooted in the local area. Because the altitude for points along the spanning tree are pre-calculated in the spanning tree, the routing tool 100 can instantly know at what altitude the aircraft needs to be in order to make it to the given landing location. It also will instantly know the path to take for minimal altitude loss.

If the aircraft is higher than the maximum altitude of the spanning tree, the on-board computer needs to connect up the aircraft's current location and heading with the spanning tree. Starting with the point on the spanning tree that is nearest the aircraft position, the routing module 102 searches the points in the spanning tree to find the first point that is still feasible after considering the altitude losses incurred flying to that point and an associated heading. Computationally, this only involves a simple spatial sort and a two turn calculation.

Figure 9:
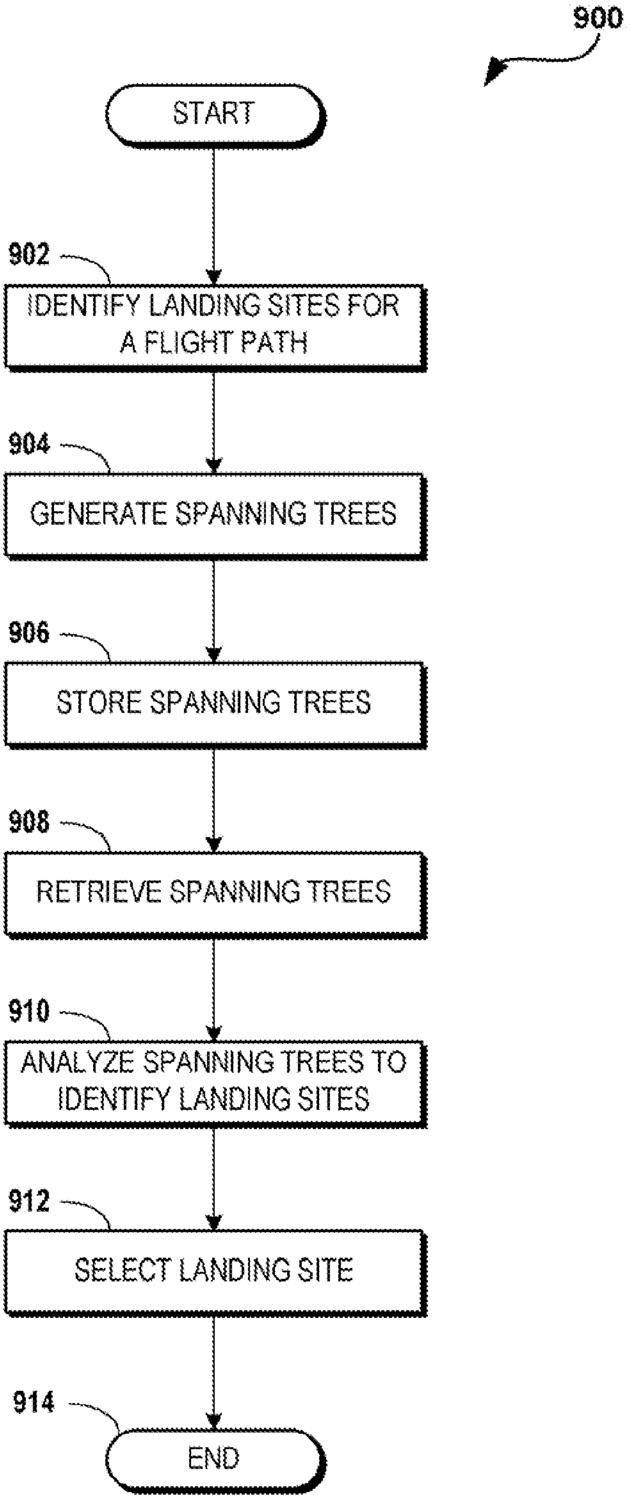
FIG. 9 shows a routine for determining landing sites for aircraft, according to an exemplary embodiment.

Turning now to FIG. 9, additional details will be provided regarding embodiments presented herein for determining landing sites for aircraft. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts, and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 9 shows a routine 900 for determining landing sites for an aircraft, according to an exemplary embodiment. In one embodiment, the routine 900 is performed by the routing module 102 described above with reference to FIG. 1. It should be understood that this embodiment is exemplary, and that the routine 900 may be performed by another module or component of an avionics system of the aircraft; by an off-board system, module, and/or component; and/or by combinations of onboard and off-board modules, systems, and components. The routine 900 begins at operation 902, wherein flight data is received. The flight data can include flight plans indicating a path for a planned flight. The flight path can be analyzed by the routing module 102 to identify landing sites such as airports, and alternative landing sites such as fields, golf courses, roadways, and the like. The routing module 102 can access one or more of the databases 104 to search for, recognize, and identify possible alternative landing sites for the anticipated flight path.

The routine 900 proceeds from operation 902 to operation 904, wherein spanning trees can be generated for each identified landing site and/or alternative landing site. As explained above, the spanning trees can be generated form the landing sites, back into the airspace along which the flight path travels. In some embodiments, a spanning tree is generated for each landing site along the flight path or within a specified range of the flight path. The specified range may be determined based upon intended cruising altitude and/or speed, and therefore the anticipated glide profile that the aircraft may have in the event of an emergency condition. It should be understood that this embodiment is exemplary, and that other factors may be used to determine the landing sites for which spanning trees should be generated.

The routine 900 proceeds from operation 904 to operation 906, wherein the generated spanning trees are loaded into a data storage location. The data storage location can be onboard the aircraft, or at the ATC, ARTCC, AOC, or another location. At some point in time, the aircraft begins the flight. The routine 900 proceeds from operation 906 to operation 908, wherein in response to an emergency condition, the spanning databases are retrieved from the data storage device. The routine 900 proceeds from operation 908 to operation 910, wherein the spanning trees are analyzed to identify one or more attainable landing sites, and to prompt retrieval of landing site information such as distance from a current position, weather at the landing sites, a time in which the route to the landing site may be selected, and the like. The routine 900 proceeds form operation 910 to operation 912, wherein the information indicating the landing sites and information relating to the landing sites such as distance from a current location, weather at the landing sites, a time in which the route to the landing site must be selected, and the like, are displayed for aircraft personnel. In addition to displaying a moving map display with the attainable landing sites and information relating to those landing sites, the routing tool 100 can obtain additional real-time data such as, for example, weather data between the current position and the landing sites, traffic data at or near the landing sites, and the like, and can display these data to the aircraft personnel.

The routine 900 proceeds from operation 910 to operation 912, wherein a landing site is selected, and the aircraft begins flying to the selected landing site. In selecting the landing site, the weather conditions at the landing site, near the landing site, or on a path to the landing site may be considered as visibility can be a vital component of a successful and safe ingress to a landing site. The routine 900 proceeds to operation 914, whereat the routine 900 ends.

Figure 10A:
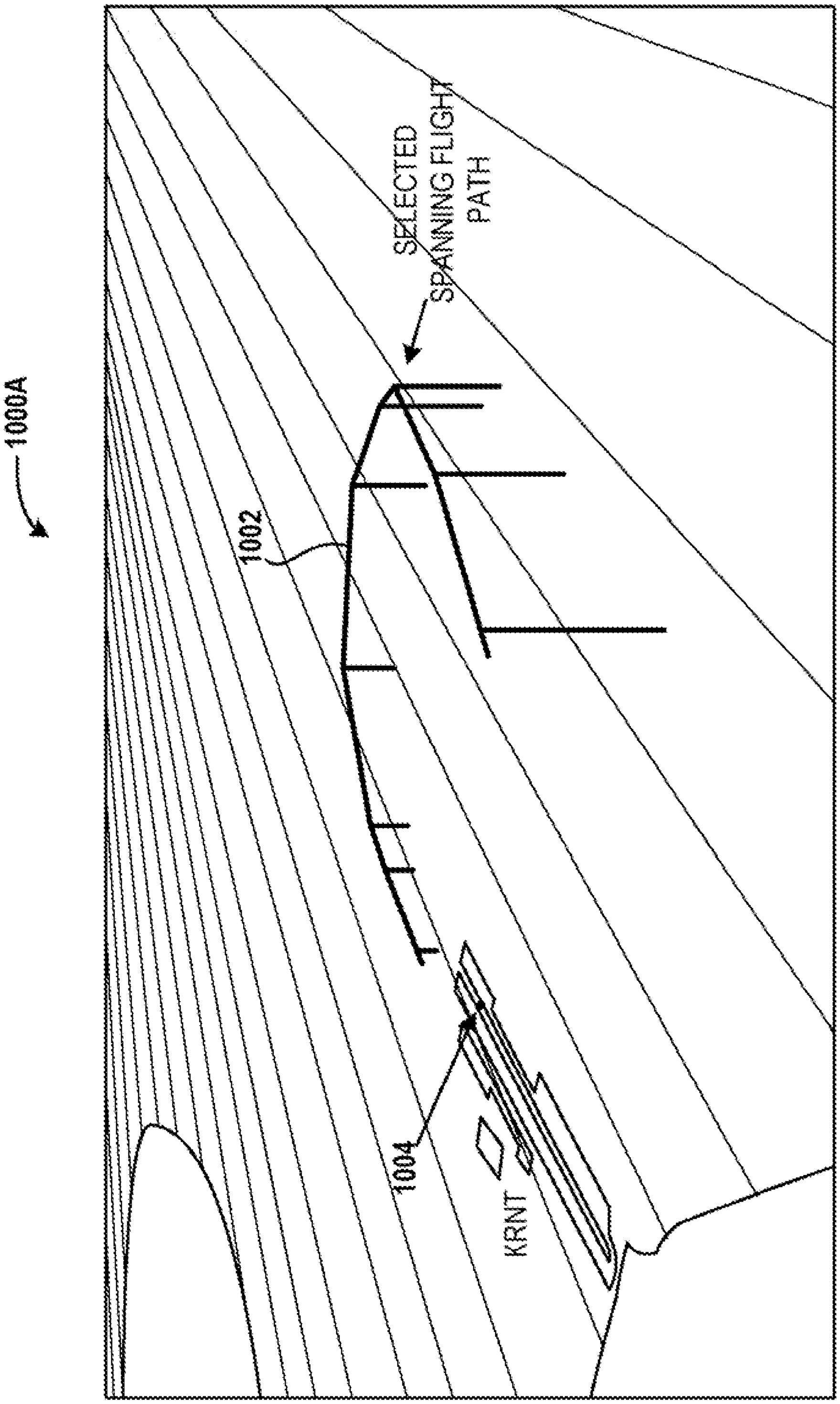
FIGS. 10A-10B illustrate screen displays provided by a graphical user interface (GUI) for the routing tool, according to exemplary embodiments.
Figure 10B:
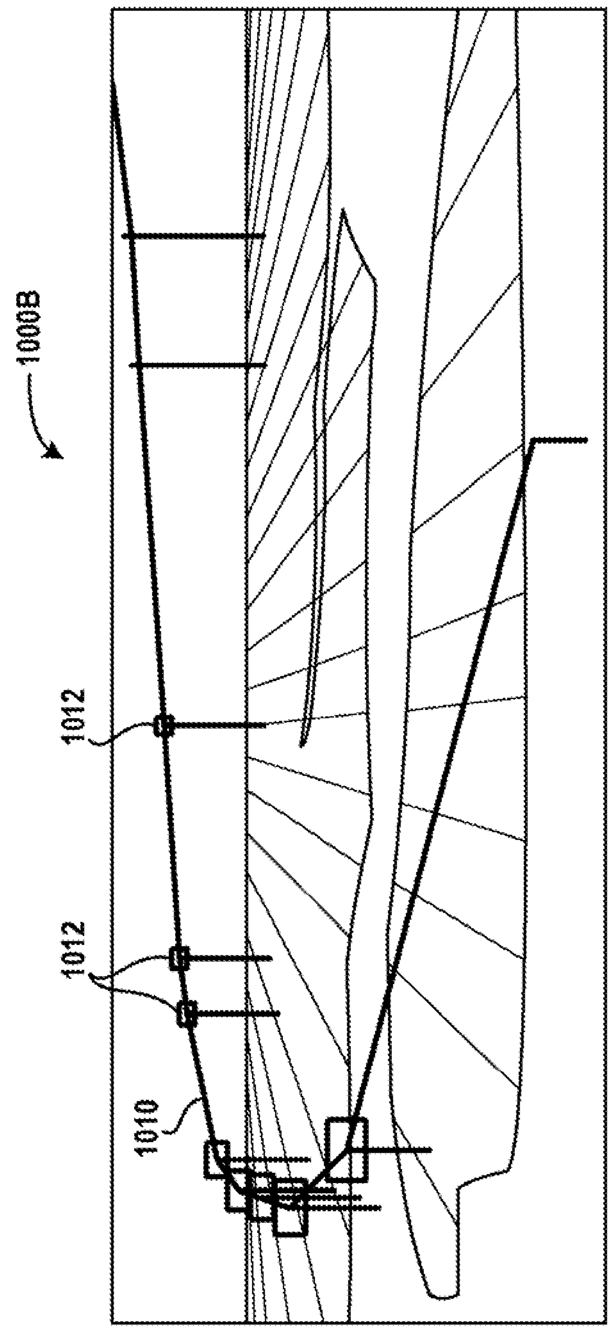

Referring now to FIGS. 10A-10B, screen displays 1000A, 1000B provided by a graphical user interface (GUI) for the routing tool 100 are illustrated, according to exemplary embodiments. The screen displays 1000A-B can be displayed on the pilot's primary flight display (PFD), if the aircraft is so equipped, or upon other displays and/or display devices, if desired. FIG. 10A illustrates a three-dimensional screen display 1000A provided by the routing tool 100, according to an exemplary embodiment. The line 1002 represents a flight path required to safely ingress into the landing site, and to touchdown at the touchdown point 1004. The view of FIG. 10A is shown from the perspective of the cockpit. From the illustrated perspective, it is evident that the aircraft currently is above the minimum altitude required for a safe landing, as indicated by the line 1002. Therefore, the aircraft has sufficient energy to reach the touchdown point 1004.

FIG. 10B illustrates another three-dimensional screen display 1000B provided by the routing tool 100, according to another exemplary embodiment. In particular, FIG. 10B illustrates a flight path 1010 for ingress to a landing site. The flight path includes targets 1012. During an approach, the pilot attempts to pass the aircraft through the targets 1012. Upon passing through all of the targets 1012, the aircraft is in position to land at the landing site. Thus, the GUI provided by the routing tool 100 can be configured to provide guidance for a pilot to navigate an aircraft to a landing site in an emergency. These embodiments are exemplary, and should not be construed as being limiting in any way.

According to various embodiments, the routing tool 100 interfaces with an ATC, ARTCC, or AOC to exchange information on potential landing sites as the flight progresses, or for allowing the ATC or AOC to monitor or control an aircraft in distress, or to potentially reroute other aircraft in the area to enhance ingress safety. According to other embodiments, the routing tool 100 is configured to report aircraft status according to a predetermined schedule or upon occurrence of trigger events such as, for example, sudden changes in altitude, disengaging an autopilot functionality, arriving within 100 miles or another distance of an intended landing site, or other events. According to yet other embodiments, the routing tool 100 determines, in real-time, potential landing sites with the assistance of an off-board computer system such as, for example, a system associated with an ATC, ARTCC, or AOC. The routing module can transmit or receive the information over the current flight operations bulletin (FOB) messaging system, or another system.

The ATC, ARTCC, and/or AOC have the capability to uplink information on potential emergency landing sites as the aircraft progresses on its flight path. For example, the ATC, ARTCC, and/or AOC can use data in the databases 104 and data from the real-time data sources 122 to determine a landing site for the aircraft. Information relating to the landing sites may be uplinked by any number of uplink means to the aircraft. The ATC, ARTCC, and/or AOC broadcast the information at regular intervals, when an emergency is reported, and/or when a request from authorized aircraft personnel is originated.

In another embodiment the aircraft broadcasts potential landing sites to the ATC, ARTCC, or AOC as the aircraft progresses on its flight. Alternatively, the aircraft broadcasts only when there is an emergency or when a request for information is made from the ATC, ARTCC, or AOC. Thus, the ATC, ARTCC, or AOC can identify, in real-time or near-real-time, the chosen landing site of an aircraft posting an emergency. If appropriate, other traffic may be re-routed to ensure a safe ingress to the chosen landing site. It should be understood that the aircraft and the ATC, ARTCC, or AOC can have continuous, autonomous, and instantaneous information on the choices of landing sites, thereby adding an extra layer of safety to the routing tool 100.

Figure 11:
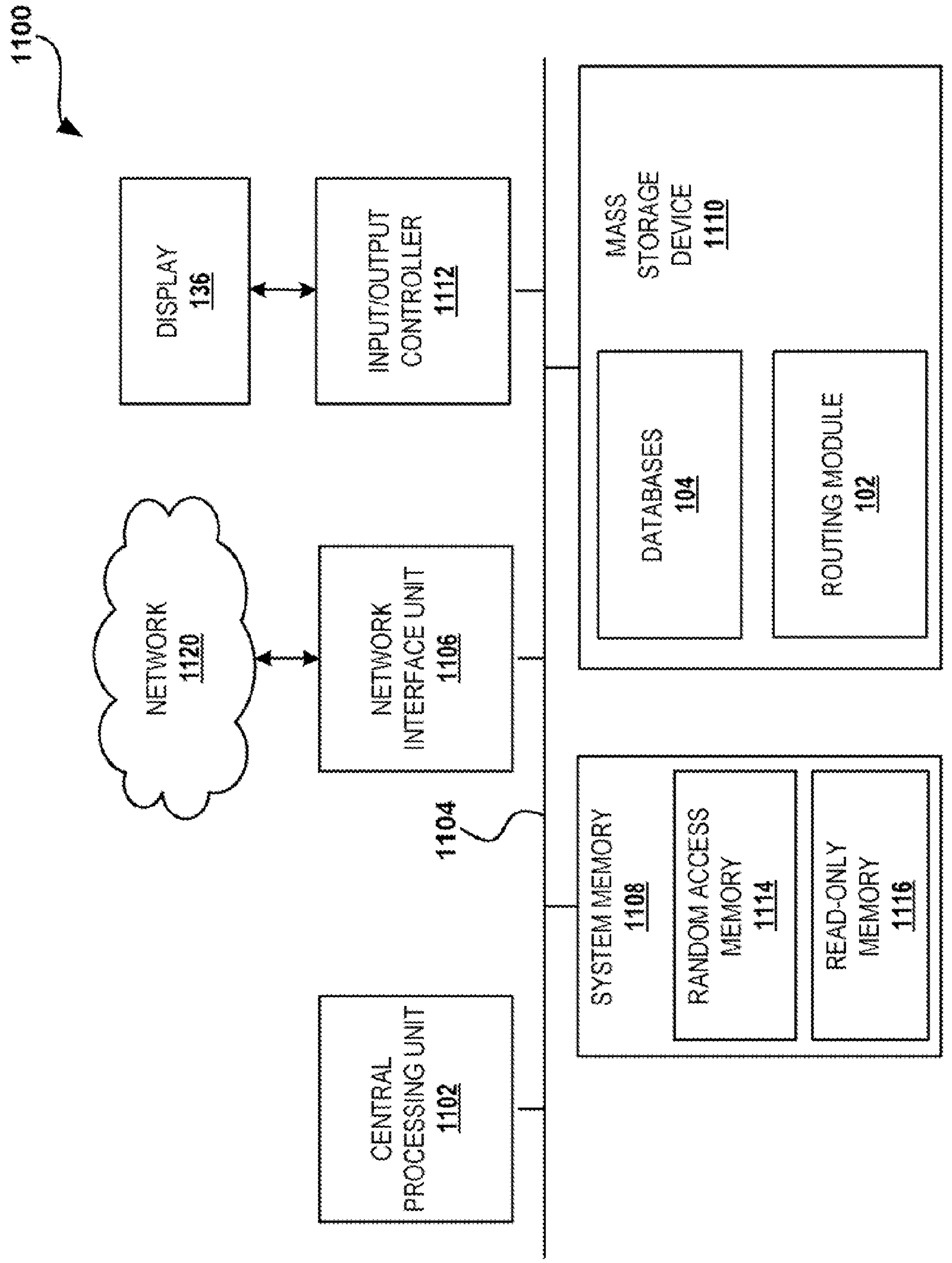
FIG. 11 shows an illustrative computer architecture of a routing tool, according to an exemplary embodiment.

FIG. 11 shows an illustrative computer architecture 1100 of a routing tool 100 capable of executing the software components described herein for determining landing sites for aircraft, as presented herein. As explained above, the routing tool 100 may be embodied in a single computing device or in a combination of one or more processing units, storage units, and/or other computing devices implemented in the avionics systems of the aircraft and/or a computing system of an ATC, AOC, or other off-board computing system. The computer architecture 1100 includes one or more central processing units 1102 ("CPUs"), a system memory 1108, including a random access memory 1114 ("RAM") and a read-only memory 1116 ("ROM"), and a system bus 1104 that couples the memory to the CPUs 1102.

The CPUs 1102 may be standard programmable processors that perform arithmetic and logical operations necessary for the operation of the computer architecture 1100. The CPUs 1102 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 1100 also includes a mass storage device 1110. The mass storage device 1110 may be connected to the CPUs 1102 through a mass storage controller (not shown) further connected to the bus 1104. The mass storage device 1110 and its associated computer-readable media provide non-volatile storage for the computer architecture 1100. The mass storage device 1110 may store various avionics systems and control systems, as well as specific application modules or other program modules, such as the routing module 102 and the databases 104 described above with reference to FIG. 1. The mass storage device 1110 also may store data collected or utilized by the various systems and modules.

The computer architecture 1100 may store programs and data on the mass storage device 1110 by transforming the physical state of the mass storage device to reflect the information being stored. The specific transformation of physical state may depend on various factors, in different implementations of this disclosure. Examples of such factors may include, but are not limited to, the technology used to implement the mass storage device 1110, whether the mass storage device is characterized as primary or secondary storage, and the like. For example, the computer architecture 1100 may store information to the mass storage device 1110 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer architecture 1100 may further read information from the mass storage device 1110 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 1100. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1100.

According to various embodiments, the computer architecture 1100 may operate in a networked environment using logical connections to other avionics in the aircraft and/or to systems off-board the aircraft, which may be accessed through a network 1120. The computer architecture 1100 may connect to the network 1120 through a network interface unit 1106 connected to the bus 1104. It should be appreciated that the network interface unit 1106 may also be utilized to connect to other types of networks and remote computer systems. The computer architecture 1100 also may include an input-output controller 1122 for receiving input and providing output to aircraft terminals and displays, such as the in-flight display 136 described above with reference to FIG. 1. The input-output controller 1122 may receive input from other devices as well, including a PFD, an EFB, a NAV, an HUD, MDU, a DSP, a keyboard, mouse, electronic stylus, or touch screen associated with the in-flight display 136. Similarly, the input-output controller 1122 may provide output to other displays, a printer, or other type of output device.

Based on the foregoing, it should be appreciated that technologies for determining landing sites for aircraft are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for generating safe ingress flight paths to an identified landing site for an aircraft, the method comprising:

generating, by a processing device, a spanning tree for the identified landing site by producing a plurality of possible approach paths by starting at a touchdown point on the identified landing site and building each of the plurality of possible approach paths from the touchdown point outward while minimizing altitude changes while moving away from the touchdown point, identifying obstructions proximate the identified landing site, and eliminating any obstructed possible approach paths of the plurality of possible approach paths that conflict with the obstructions to produce a plurality of allowed approach paths to the touchdown point;

storing, in a data storage device, the spanning tree including the allowed approach paths;

providing information from the spanning tree in the data storage device to an in-flight display for use by aircraft personnel; and providing a countdown timer with each of the plurality of allowed approach paths indicating a time in which the allowed approach path remains available as an option for the identified landing site.

2. The method of claim 1, further comprising:

receiving, by the processing device, flight data corresponding to a flight path, wherein receiving the flight data comprises receiving the flight data at a routing tool associated with the aircraft during planning of a flight.

3. The method of claim 2, wherein receiving the flight data comprises receiving the flight data at a routing tool associated with the aircraft during a flight.

4. The method of claim 2, wherein receiving the flight data comprises receiving the flight data at an off-board routing tool associated with an air traffic control system before a flight is commenced.

5. The method of claim 4, further comprising:

detecting, by the processing device, an emergency condition during a flight of the aircraft; and in response to detecting the emergency, transmitting data to the air traffic control system indicating occurrence of the emergency; and receiving the spanning tree from the air traffic control system.

6. The method of claim 2, wherein receiving the flight data comprises receiving the flight data at an off-board routing tool associated with an air traffic control system during a flight.

7. The method of claim 1, further comprising detecting an emergency condition during a flight of the aircraft.

8. The method of claim 7, further comprising:

in response to detecting the emergency, retrieving the spanning tree from the data storage device; and passing the spanning tree to a display system of the aircraft.

9. The method of claim 1, further comprising displaying a vertical profile view of a glide path for approach to the identified at least one landing site.

10. The method of claim 1, further comprising:

querying the spanning tree with respect to a given location;

determining, by a processing device, a minimum altitude needed to reach the touchdown point from the given location; and following, by the processing device, one of the allowed approach paths to the touchdown point of the spanning tree that minimizes altitude loss during ingress to the touchdown point on the identified at least one landing site.

11. The method of claim 1, wherein at least one of the plurality of possible approach paths crosses over itself at a point such that a heading associated with a first route over the point is different than a heading associated with a second route over the point.

12. A routing tool for generating safe ingress flight paths to an identified landing site for an aircraft, the routing tool comprising a database configured to store flight data corresponding to a flight path for the aircraft, and a routing module configured to:

generate a spanning tree for the identified landing site by producing a plurality of possible approach paths by starting at a touchdown point on the identified landing site and building each of the plurality of possible approach paths from the touchdown point outward while minimizing altitude changes while moving away from the touchdown point, identifying obstructions proximate the identified landing site, and eliminating any obstructed possible approach paths of the plurality of possible approach paths that conflict with the obstructions to produce a plurality of allowed approach paths to the touchdown point;

store, in a data storage device, the spanning tree including the allowed approach paths;

provide information from the spanning tree in the data storage device to an in-flight display for use by aircraft personnel; and provide a countdown timer with each of the plurality of allowed approach paths indicating a time in which the allowed approach path remains available as an option for the identified landing site.

13. The routing tool of claim 12, wherein the routing tool comprises a component of an air traffic control system.

14. The routing tool of claim 12, wherein the spanning trees are generated before a flight is commenced.

15. The routing tool of claim 12, wherein the spanning trees are generated in real-time, in response to detecting an emergency during a flight of the aircraft.

16. The routing tool of claim 12, further comprising a performance learning system for generating an aircraft performance model, wherein the aircraft performance model is used to generate the spanning tree.

17. The routing tool of claim 12, further comprising:

storing, in a data storage device, the spanning tree including the allowed approach paths at a storage device;

querying the spanning tree with respect to a given location;

determining a minimum altitude needed to reach the touchdown point from the given location; and following one of the allowed approach paths to the touchdown point of the spanning tree that minimizes altitude loss during ingress to the touchdown point on the identified at least one landing site.

18. A non-transitory computer readable storage medium having computer executable instructions stored thereon, the execution of which by a processor cause a routing tool to:

generate a spanning tree for an identified landing site by producing a plurality of possible approach flight paths by starting at a touchdown point on the identified landing site and building each of the plurality of possible approach paths from the touchdown point outward while minimizing altitude changes while moving away from the touchdown point, identifying obstructions proximate the identified landing site, and eliminating any obstructed possible approach paths of the plurality of possible approach paths that conflict with the obstructions to produce a plurality of allowed approach paths to the touchdown point;

store, in a data storage device, the spanning tree including the allowed approach paths;

provide information from the spanning tree in the data storage device to an in-flight display for use by aircraft personnel;

display a vertical profile view of a glide path for approach to the identified at least one landing site that includes current aircraft position; and providing a countdown timer with each of the plurality of allowed approach paths indicating a time in which the allowed approach path remains available as an option for the identified landing site.

19. The computer readable storage medium of claim 18, having computer executable instructions stored thereon, the execution of which by a processor further cause a routing tool to:

detect an emergency at the aircraft during a flight of the aircraft; and in response to detecting the emergency, display the spanning tree including the allowed approach paths for selection of the identified at least one landing site.

* * * * *